(12) United States Patent
Fujita et al.

(10) Patent No.: US 6,366,190 B1
(45) Date of Patent: Apr. 2, 2002

(54) MAGNETO-SPRING STRUCTURE

(75) Inventors: Etsunori Fujita; Yoshimi Enoki; Hiroshi Nakahira; Eiji Sugimoto; Shigeki Wagata; Hideyuki Yamane; Shigeyuki Kojima; Kazuyoshi Chizuka, all of Hiroshima (JP)

(73) Assignee: Delta Tooling Co., Ltd., Hiroshima (JP)

( * ) Notice: Subject to any disclaimer, the term of this patent is extended or adjusted under 35 U.S.C. 154(b) by 0 days.

(21) Appl. No.: 09/739,964

(22) Filed: Dec. 20, 2000

(30) Foreign Application Priority Data

Dec. 22, 1999 (JP) .............................. 11-364325

(51) Int. Cl.[7] .............................. H02K 7/09; H02K 5/24
(52) U.S. Cl. ..................... 335/285; 335/302; 335/306; 310/90.5; 280/5.515; 248/564; 248/566
(58) Field of Search ................................ 335/302–306, 335/285; 310/90.5; 248/560–681; 280/5.515; 296/65.02, 189

(56) References Cited

U.S. PATENT DOCUMENTS 6,084,329 A * 7/2000 Fujita et al. ................ 310/90.5

* cited by examiner

Primary Examiner—Ramon M. Barrera
(74) Attorney, Agent, or Firm—Wenderoth, Lind & Ponack, L.L.P.

(57) ABSTRACT

A magneto-spring structure includes a lower frame and an upper frame vertically movably mounted on the lower frame via a link mechanism. The upper and lower frames have respective permanent magnets secured thereto, with like magnetic pole opposed to each other. The link mechanism includes a plurality of links and a connecting member for rotatably connecting them via a bearing. The links are made of non-magnetic material, while the bearing is made of ferromagnetic material.

5 Claims, 24 Drawing Sheets

MAGNETO-SPRING STRUCTURE

BACKGROUND OF THE INVENTION

1. Field of the Invention

The present invention relates generally to a magneto-spring structure in which like magnetic poles are opposed to each other and, in particular but not exclusively, to a magneto-spring structure having a variable dynamic spring constant.

2. Description of the Related Art

Recently, technologies in connection with transportation facilities including motor vehicles have developed rapidly, and there is a demand for enhanced safety and comfortability as well as increased performance. Further, damage to the muscular and nervous systems of vehicle occupants due to exposure to vibration is becoming an issue. Symptoms of these types of damage include fatigue, vision problems or the like. Accordingly, it is important to improve the riding comfort in terms of active safety. To this end, a mechanism for reducing vibration that is inputted to the human body from vehicles is required, and various vibration models have been proposed and are put to practical use.

In recent years, accompanying the practical use of permanent magnets that have a high coercive force and high residual magnetic flux density, research is flourishing in a field such as mechanical structures and magnetic systems that utilize magnetic levitation, magnetic bearings, MR dampers, etc., which use magnetic forces and magnetic fluidity to control vibration. Because the magnetic levitation damping technology makes it possible to support physical objects with no actual physical contact, its merits include reduction of problems related to friction and wear, the capability of moving at very high speeds, and low levels of vibration and noise. Moreover, it has the advantage of being able to be used in special situations and the advantage of its force being effective in all directions. For those reasons, magnetic levitation vehicles, magnetic bearings, etc. which apply these special characteristics are being developed.

Of the levitation technologies that utilize these types of magnetic forces, the majority utilizes attractive forces. Magnetic circuits that make use of repulsive forces are difficult to utilize in vibration control systems, due to their instability, the fact that the marked non-linear characteristics of the repulsive forces are difficult to control, and their large spring constant.

In view of the above, the inventors of this application have repeated researches for practical use of a magneto-spring structure employing repulsive magnets or a suspension unit employing such a magneto-spring structure. However, in the case of the magneto-spring structures that have been researched up to this time, it has been found that the dynamic spring constant is constant independently of the amplitude of input vibration and that a structure capable of varying the dynamic spring constant depending on the input amplitude is advantageous in terms of vibration absorption.

SUMMARY OF THE INVENTION

The present invention has been developed to overcome the above-described disadvantages.

It is accordingly an objective of the present invention to provide an inexpensive and compact magneto-spring structure capable of effectively attenuating vibration input from outside by varying the dynamic spring constant.

In accomplishing the above and other objectives, the magneto-spring structure according to the present invention includes a lower frame and an upper frame vertically movably mounted on the lower frame via a link mechanism having a plurality of links. The upper and lower frames have respective permanent magnets secured thereto, with like magnetic poles opposed to each other. The magneto-spring structure also includes a connecting member for rotatably connecting the plurality of links, and a bearing in which the connecting member is inserted. The plurality of links are made of non-magnetic material, while the bearing is made of ferromagnetic material.

By this construction, magnetic flux from the permanent magnets secured to the upper and lower frames is concentrated on the bearing and increases frictional forces that act between constituent elements in the bearing. As a result, the dynamic coefficient of friction of the magneto-spring structure varies depending on input vibration, and the dynamic spring constant varies, making it possible to effectively attenuate the input vibration.

It is preferred that the connecting member be made of non-magnetic material. By so doing, the magnetic flux is concentrated on balls in the bearing, thus enabling the dynamic spring constant to vary largely.

By way of example, the magneto-spring structure according to the present invention is used for an engine mount to considerably reduce vibration inputted to a vehicle body from the engine. In this case, it is preferred that an elastic member be interposed between the upper and lower frames. The elastic member acts to further reduce the input vibration.

Advantageously, each of the permanent magnets is a two-pole magnet having two different magnetic poles on each of opposite surfaces thereof. The use of the two-pole magnets results in a compact and inexpensive magneto-spring structure, because they provide a large repulsive force when like magnetic poles are opposed to each other.

BRIEF DESCRIPTION OF THE DRAWINGS

The above and other objectives and features of the present invention will become more apparent from the following description of preferred embodiments thereof with reference to the accompanying drawings, throughout which like parts are designated by like reference numerals, and wherein.

DETAILED DESCRIPTION OF THE PREFERRED EMBODIMENTS

This application is based on an application No. 11-364325 filed Dec. 22, 1999 in Japan, the content of which is herein expressly incorporated by reference in its entirety.

Figure 1:
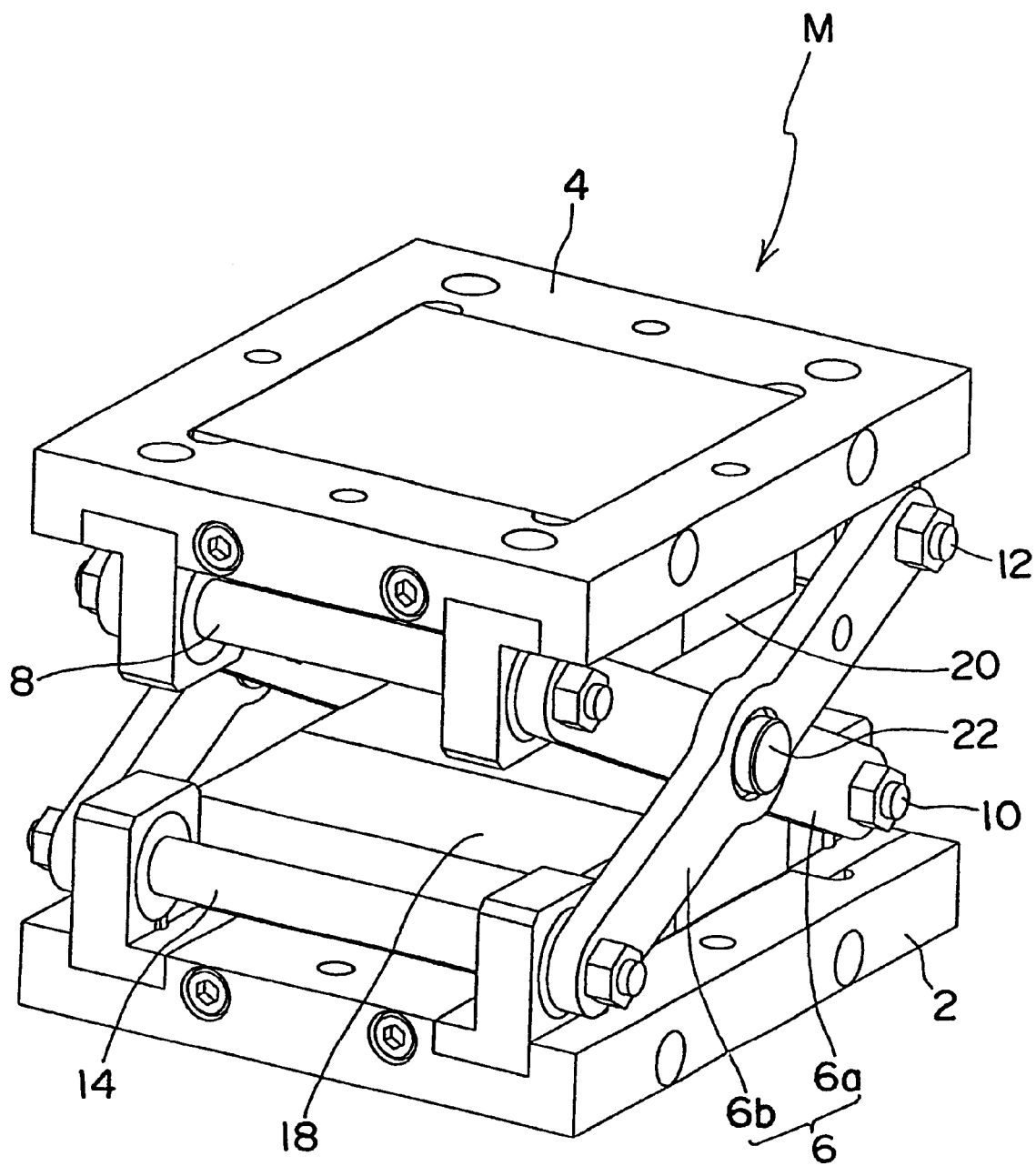
FIG. 1 is a perspective view of a magneto-spring structure according to the present invention.
Figure 2:
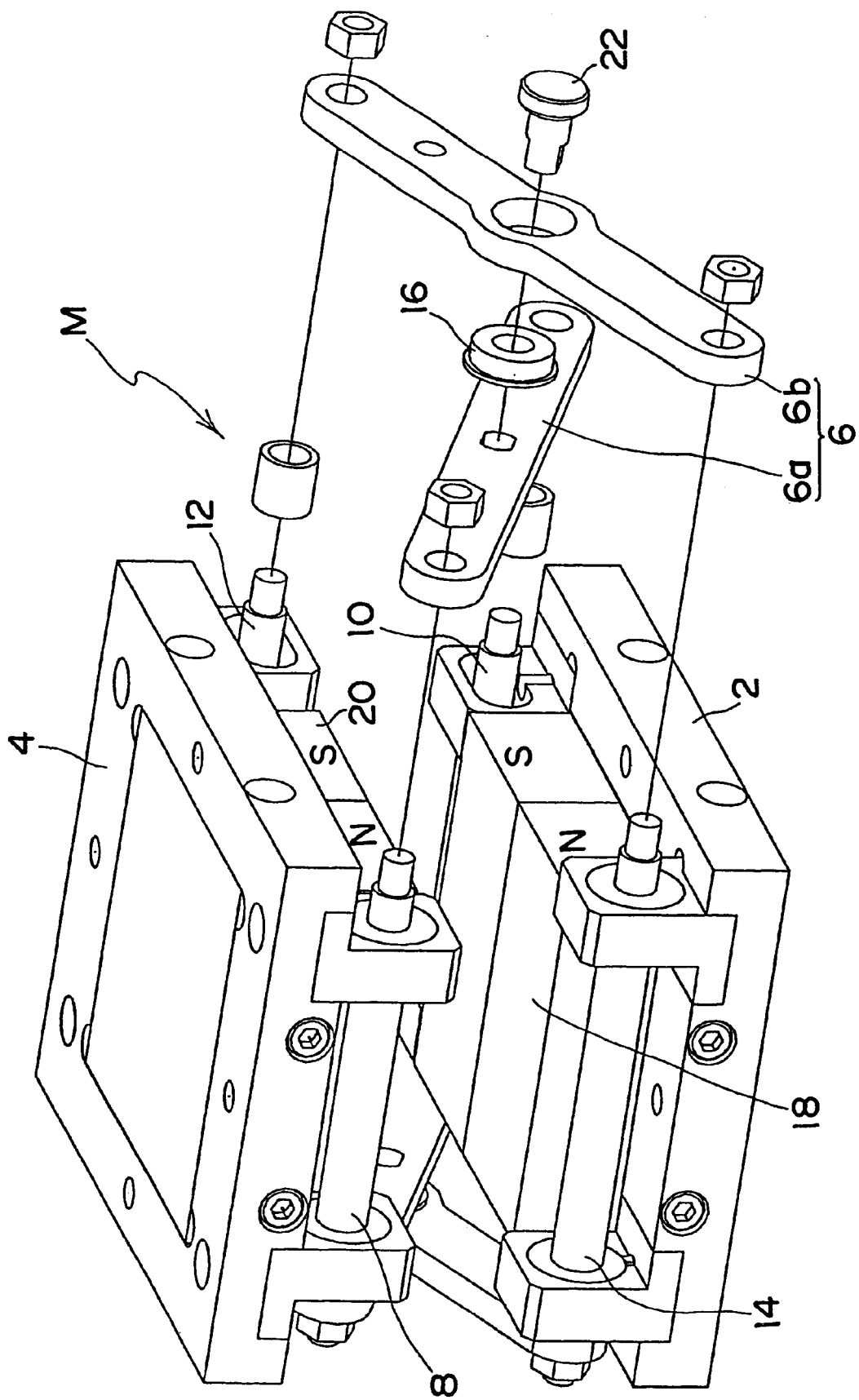
FIG. 2 is an exploded perspective view of the magneto-spring structure of FIG. 1.

Referring now to the drawings, there is shown in FIGS. 1 and 2 a magneto-spring structure M embodying the present invention, which is used for, for example, an automobile suspension unit. The magneto-spring structure M includes a lower frame 2, which is to be secured to the vibration source side, and an upper frame 4 vertically movably mounted on the lower frame 2 via a link mechanism.

The link mechanism includes X-shaped link assemblies 6, 6 disposed on respective sides of the magneto-spring structure M. Each of the X-shaped link assemblies 6, 6 includes two links 6a, 6b. An upper end of the link 6a is pivotally mounted on one end of a rotary shaft 8 that is rotatably mounted on a front end portion of the upper frame 4, while a lower end of the link 6a is pivotally mounted on one end of a rotary shaft 10 that is rotatably mounted on a rear end portion of the lower frame 2. On the other hand, an upper end of the link 6b is pivotally mounted on one end of a rotary shaft 12 that is rotatably mounted on a rear end portion of the upper frame 4, while a lower end of the link 6b is pivotally mounted on one end of a rotary shaft 14 that is rotatably mounted on a front end portion of the lower frame 2. Intermediate portions of the two links 6a, 6b are rotatably connected to each other via a pin 22 and a bearing 16.

Two-pole permanent magnets 18, 20 are secured to the upper surface of the lower frame 2 and the lower surface of the upper frame 4, respectively, with like magnetic poles opposed to each other. The two two-pole magnets 18, 20 constitute a magneto-spring, and a repulsive force created therebetween is used to lift the upper frame 4. The "two-pole magnet" used herein is a magnet having two different magnetic poles on each of the opposite surfaces thereof.

Where the magneto-spring structure M of the above-described construction is used for an automobile suspension unit, the lower frame 2 is secured to the vibration source side such, for example, as a vehicle floor, while a seat is securely mounted on the upper frame 4. The weight of a seat occupant is supported by the repulsive force of the two permanent magnets 18, 20.

The magneto-spring structure M has non-linear spring characteristics and attenuates an input from the vibration source side to a constant amplitude. The attenuated vibration is converted into micro vibration and absorbed by the link mechanism.

More specifically, the links 6a, 6b and the pin 22 inserted in the bearing 16 for rotatably connecting the links 6a, 6b are each made of non-magnetic material such as aluminum, while an external ring, an internal ring, and balls constituting the bearing 16 are each made of magnetic material such as iron or steel. By so doing, magnetic flux from the permanent magnets 18, 20 is concentrated on the bearing 16 and restrains the motion of the bearing 16.

Figure 3A:
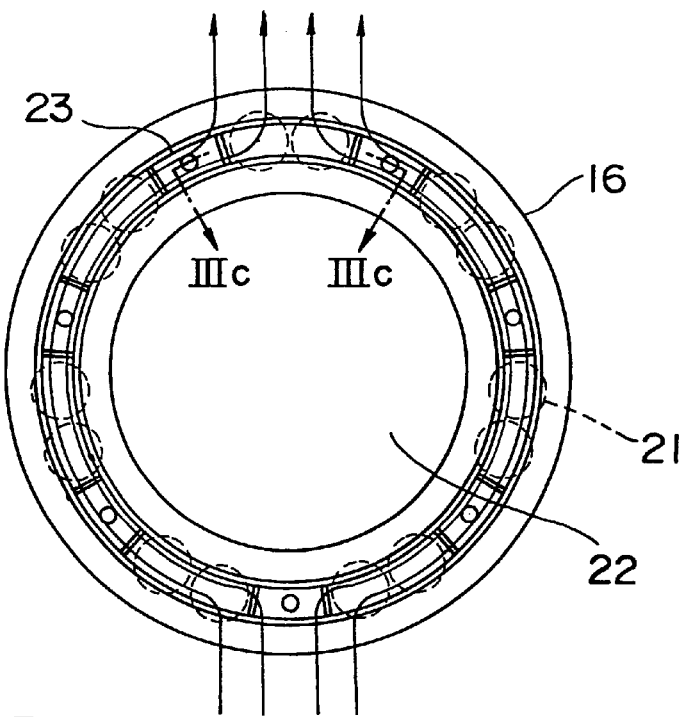
FIG. 3A is a front view of a bearing incorporated in a link mechanism of the magneto-spring structure of FIG. 1, particularly depicting magnetic flux flowing therethrough where a connecting member for supporting the bearing is made of non-magnetic material.
Figure 3B:
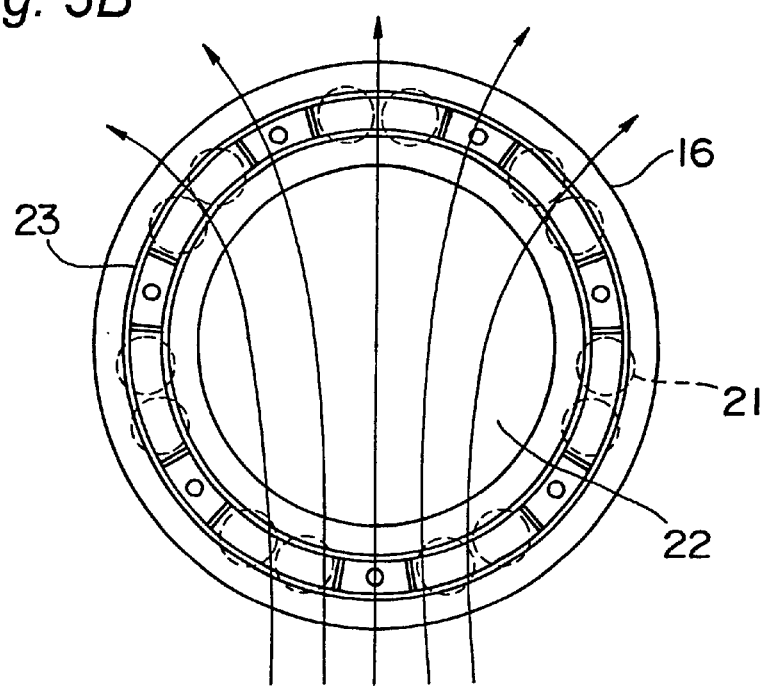
FIG. 3B is a view similar to FIG. 3A, but depicting magnetic flux flowing through the bearing where the connecting member is made of ferromagnetic material.
Figure 3C:
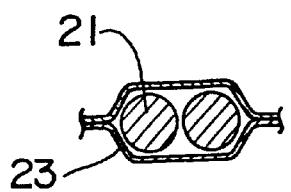
FIG. 3C is a cross-sectional view taken along line IIIc—IIIc in FIG. 3A.

FIGS. 3A and 3B depict magnetic flux flowing through the bearing 16. The bearing shown in FIG. 3A employs an aluminum-made pin, while that shown in FIG. 3B employs an iron-made pin. FIG. 3C is a cross-sectional view taken along line IIIc—IIIc in FIG. 3A.

As shown in FIG. 3A, where the pin 22 is made of non-magnetic material, the external magnetic flux is concentrated on the balls 21 of the bearing 16. Consequently, with an increase in the frictional force at the connecting portion between the links 6a, 6b, the resistance load increases, and the dynamic coefficient of friction of the magneto-spring structure M varies. In FIGS. 3A and 3B, reference numeral 23 denotes a retainer for rotatably holding the balls 21.

Figure 4:
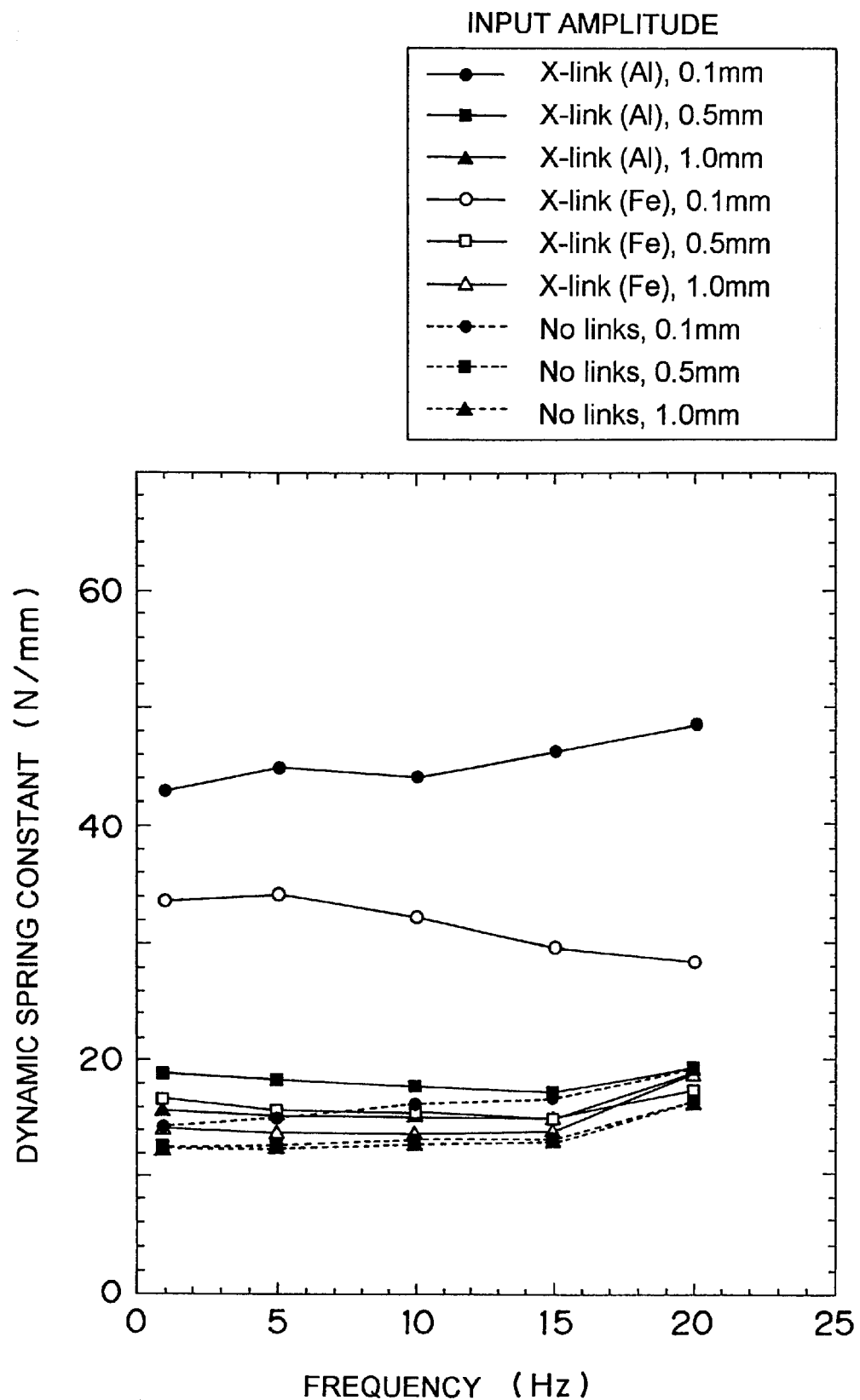
FIG. 4 is a graph depicting changes in dynamic spring constant relative to the input amplitude when vibration has been inputted to the magneto-spring structure of FIG. 1.

FIG. 4 depicts changes in dynamic spring constant relative to the input amplitude when vibration has been input to the magneto-spring structure M. The permanent magnets 18, 20 have a size of 70 mmL×35 mmW×10 mmH and are spaced 35 mm from each other. In the figure, "X-link (Al)" means the case wherein the links 6a, 6b and the pin 22 are made of aluminum, while "X-link (Fe)" means the case wherein they are made of iron. "No links" means the case wherein the X-shaped link assemblies 6, 6 are removed from the magneto-spring structure M, but the upper frame 4 is vertically movably supported relative to the lower frame 2.

As can be seen from the graph of FIG. 4, in the case of "No link", even if the input amplitude varies to be 0.1 mm, 0.5 mm, and 1.0 mm, the dynamic spring constant does not vary so much. In the case of "X-link (Fe)", the external magnetic flux is concentrated on the bearing 16, and the dynamic coefficient of friction of the magneto-spring structure M varies. As a result, the dynamic spring constant varies considerably depending on the input amplitude. In the case of "X-link (Al)", the external magnetic flux is concentrated on the balls of the bearing 16, and the dynamic spring constant varies greatly depending on the input amplitude. As the input amplitude decreases, the dynamic spring constant increases remarkably.

Figure 5:
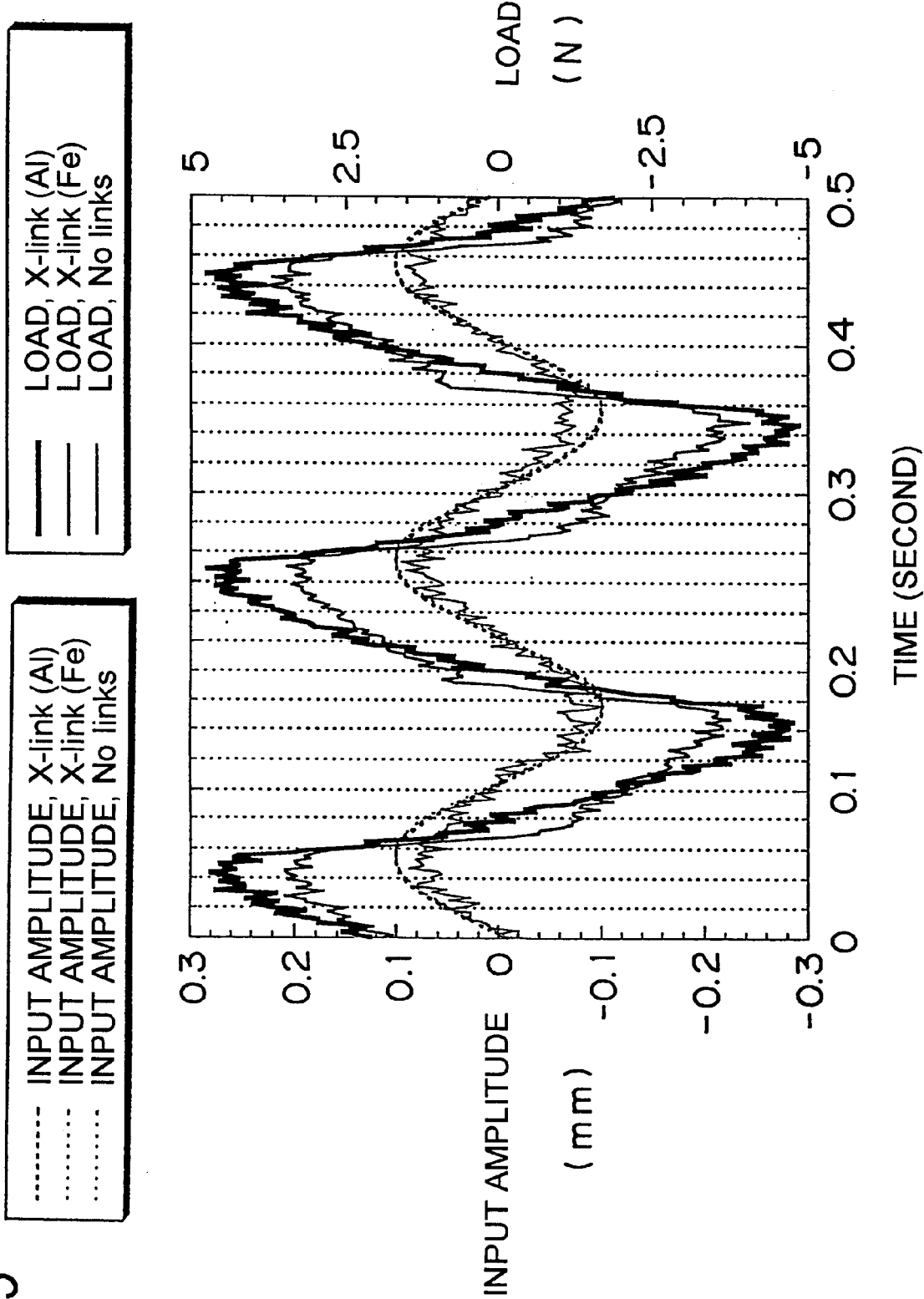
FIG. 5 is a graph depicting load changes with time when vibration of a 0.1 mm amplitude has been inputted to the magneto-spring structure of FIG. 1.
Figure 6:
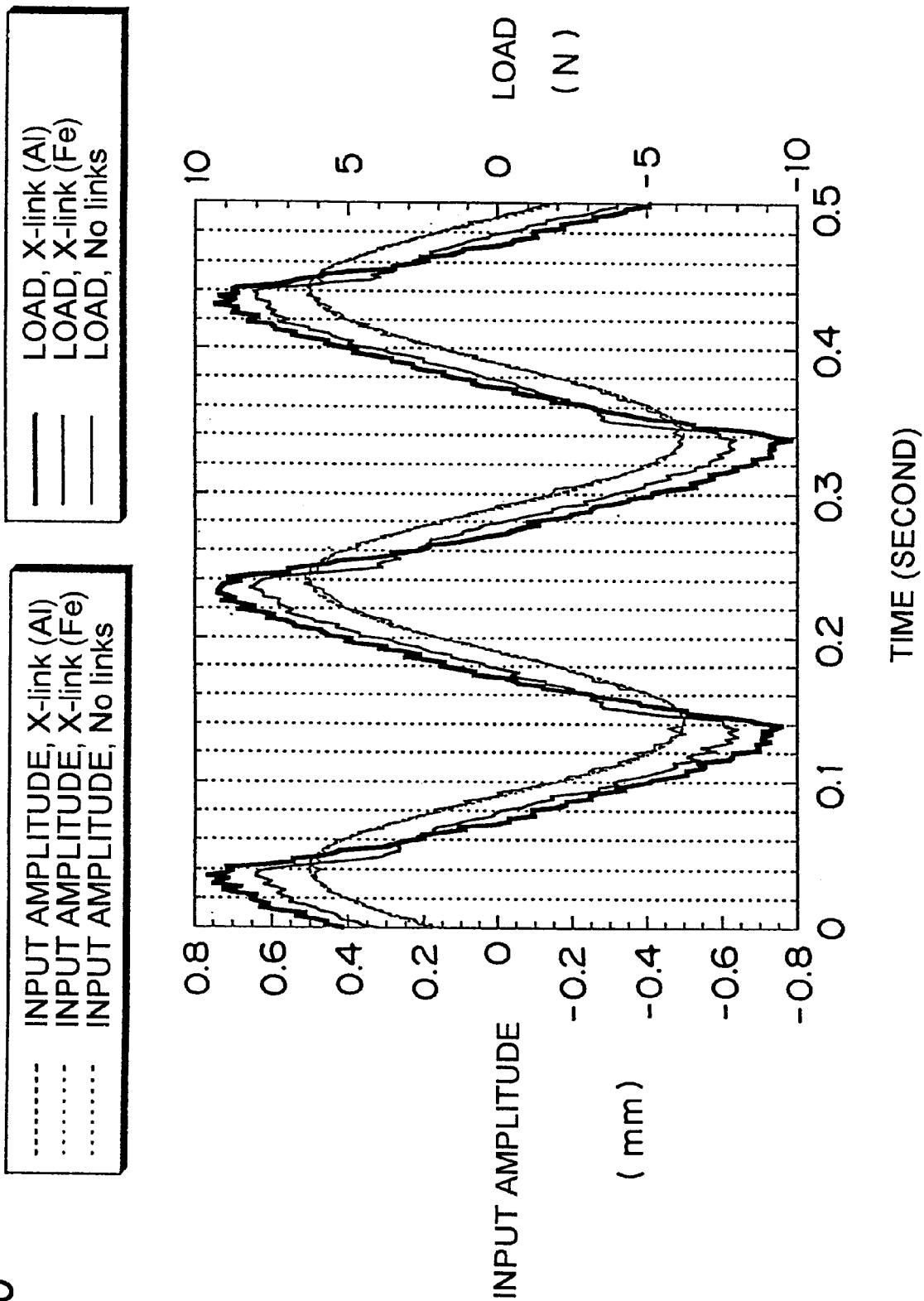
FIG. 6 is a graph depicting load changes with time when vibration of a 0.5 mm amplitude has been inputted to the magneto-spring structure of FIG. 1.
Figure 7:
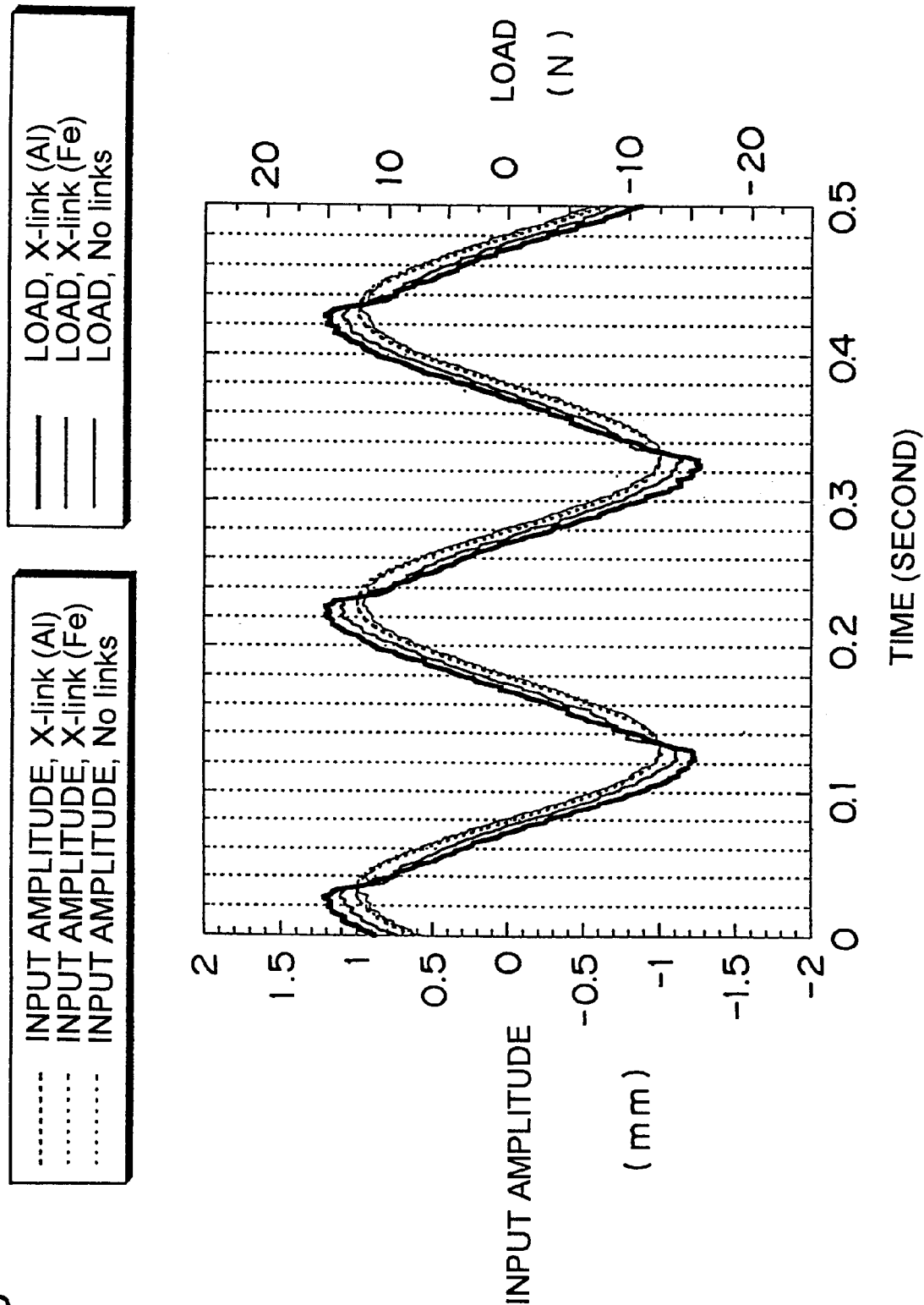
FIG. 7 is a graph depicting load changes with time when vibration of a 1.0 mm amplitude has been inputted to the magneto-spring structure of FIG. 1.

FIGS. 5 to 7 depict load changes with time when vibration has been inputted to the magneto-spring structure M, the input amplitude being 0.1 mm, 0.5 mm, an 1.0 mm, respectively.

As can be seen from the graphs of FIGS. 5 to 7, with an increase in the frictional force at the connecting portion between the links 6a, 6b, the resistance load increases. As described above, this is caused by the concentration of the external magnetic flux on the bearing 16, particularly on the balls. This phenomenon becomes conspicuous as the input amplitude decreases. As described above, the magneto-spring structure M according to the present invention acts to effectively attenuate the input amplitude.

The relationship between the magnetic flux flowing through the bearing 16 and the working torque is explained hereinafter with reference to FIG. 8.

Figure 8A:
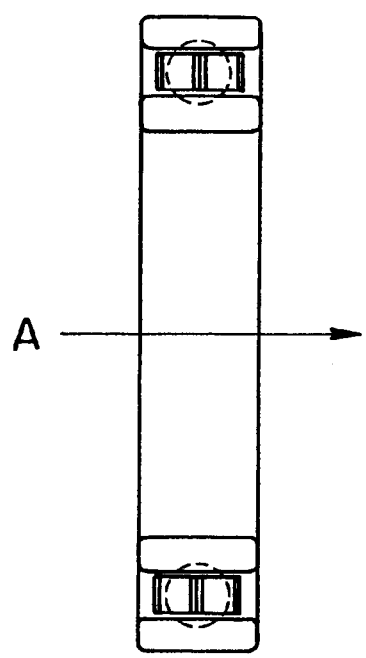
FIG. 8A is a side view of the bearing, particularly depicting magnetic flux flowing therethrough in the axial direction thereof.
Figure 8B:
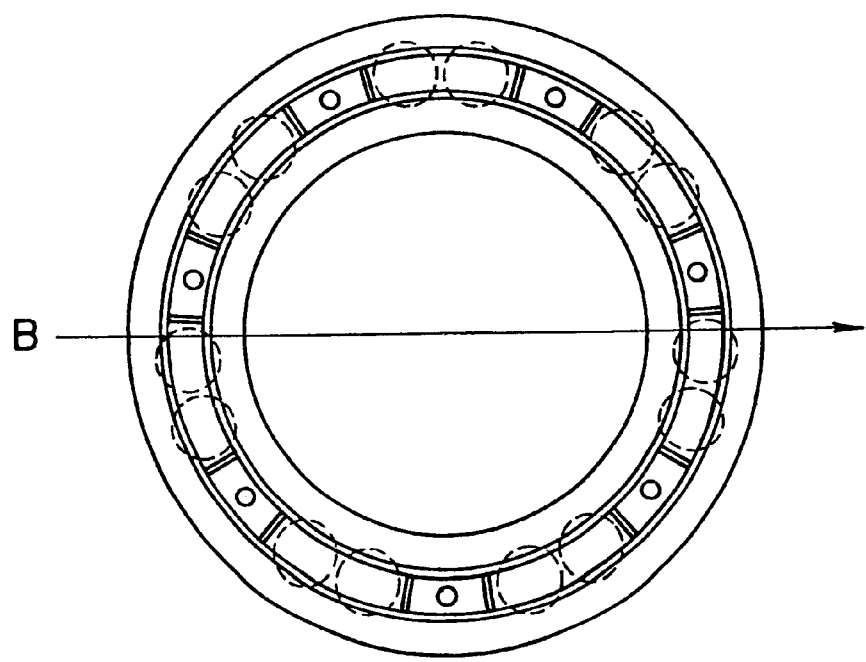
FIG. 8B is a front view of the bearing, particularly depicting magnetic flux flowing therethrough in a direction perpendicular to the axial direction thereof.

Under the condition in which a certain bearing is placed in a field with no magnetic flux, when magnetic flux is caused to flow in the axial direction of the bearing as shown in FIG. 8A, or in a direction perpendicular thereto as shown in FIG. 8B, the following results were obtained.

| Direction of Magnetic Flux | Working Torque (mm • kg • f) |
| --- | --- |
| No magnetic flux | 0.117 |
| Axial direction (direction of arrow A) | 0.273 |

-continued

| Direction of Magnetic Flux | Working Torque (mm • kg • f) |
| --- | --- |
| Direction perpendicular to the axial direction (direction of arrow B) | 0.403 |

It is to be noted that the entire body of each ball of the bearing is not necessarily made of ferromagnetic material. By way of example, part of each ball (for example, half (hemispherical portion) of each ball) may be made of ferromagnetic material, while the other part of the bearing may be made of non-magnetic material.

Figure 9:
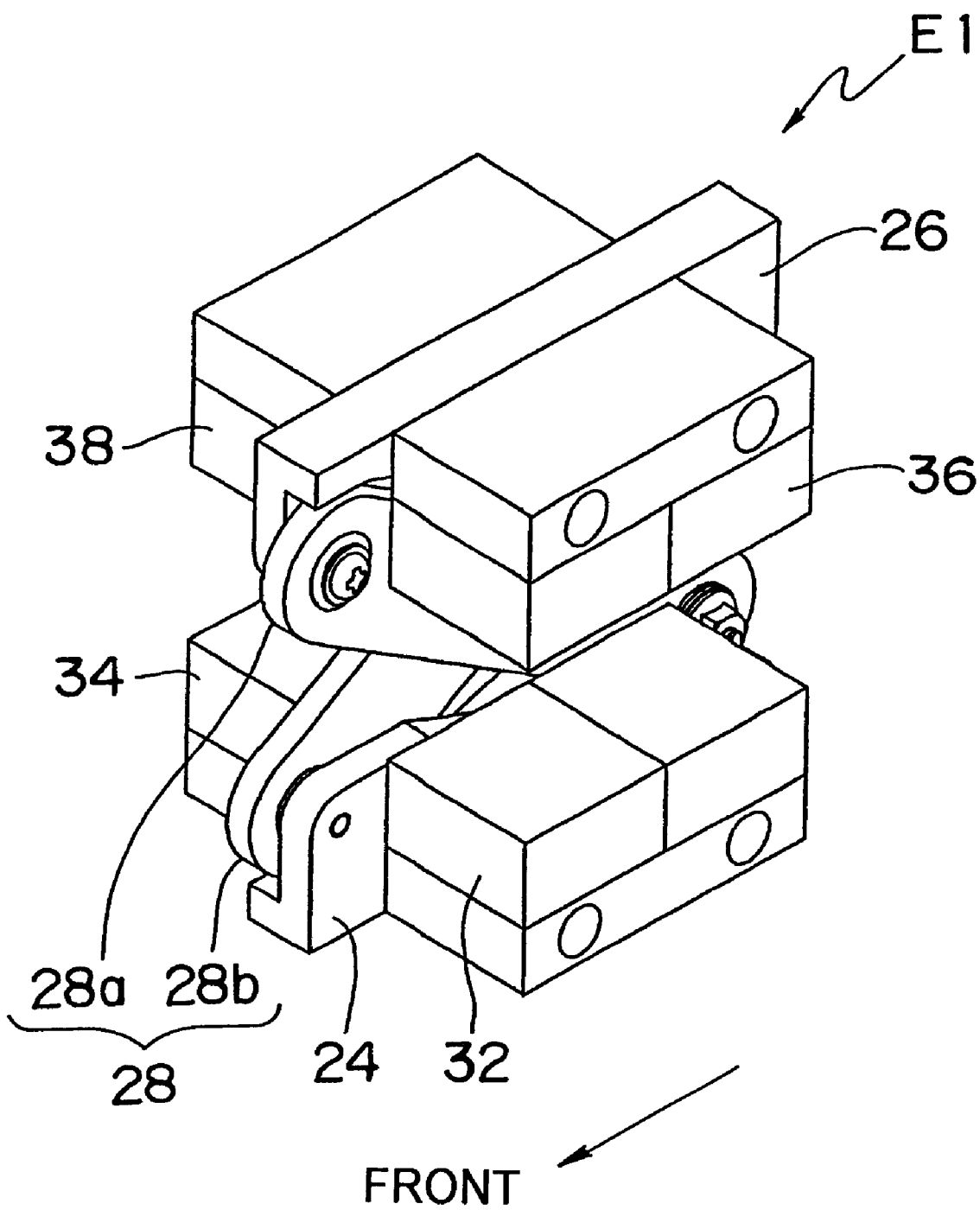
FIG. 9 is a perspective view of an engine mount in which a magneto-spring structure according to the present invention is employed.
Figure 10:
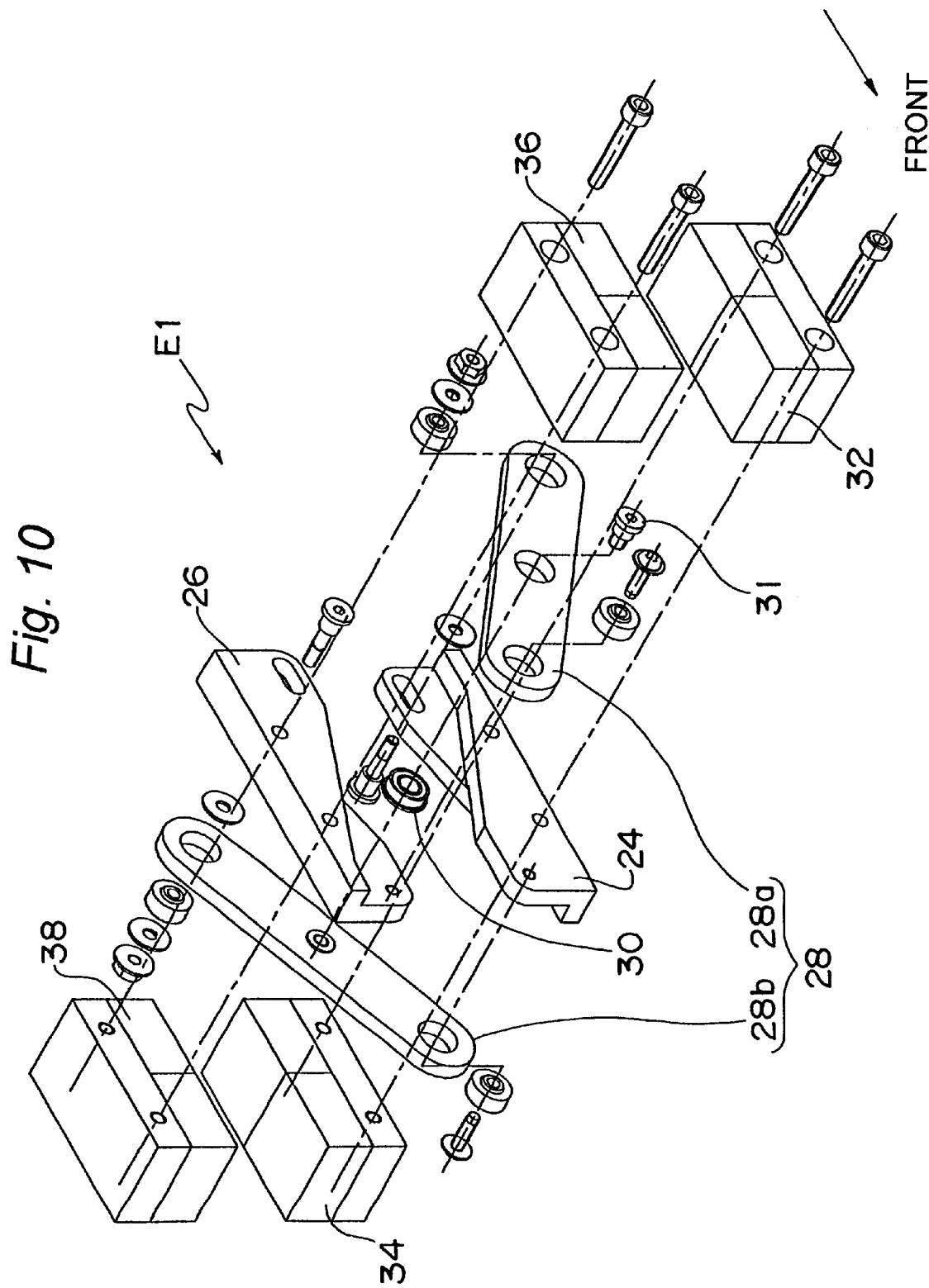
FIG. 10 is an exploded perspective view of the engine mount of FIG. 9.

FIGS. 9 and 10 depict an engine mount E1 employing the magneto-spring structure M according to the present invention.

The engine mount E1 includes a lower frame 24, which is to be secured to a vehicle floor, and an upper frame 26 vertically movably mounted on the lower frame 24 via a link mechanism.

The link mechanism includes an X-shaped link assembly 28 having two links 28a, 28b. An upper end of the link 28a is pivotally mounted on a front end portion of the upper frame 26, while a lower end of the link 28a is pivotally mounted on a rear end portion of the lower frame 24. On the other hand, an upper end of the link 28b is pivotally mounted on a rear end portion of the upper frame 26, while a lower end of the link 28b is pivotally mounted on a front end portion of the lower frame 24. Intermediate portions of the two links 28a, 28b are rotatably connected to each other via bearing 30 and a pin 31 employed as a connecting member.

Two-pole permanent magnets 32, 34 are secured to the lower frame 24 on respective sides thereof, while two-pole permanent magnets 36, 38 are likewise secured to the upper frame 26 on respective sides thereof, with like magnetic poles opposed to each other. Each set of the two-pole magnets 32, 36 and the two-pole magnets 34, 38 constitutes a magneto-spring, and a repulsive force created therebetween is used to lift the upper frame 26.

In the engine mount E1 of the above-described construction, the weight of an engine (not shown) placed on the upper frame 26 is supported by the repulsive force of the two magneto-springs 32, 36 and 34, 38, and vibration from the engine is attenuated by the non-linear spring characteristics of the magneto-springs and is further absorbed by the link mechanism.

Figure 11:
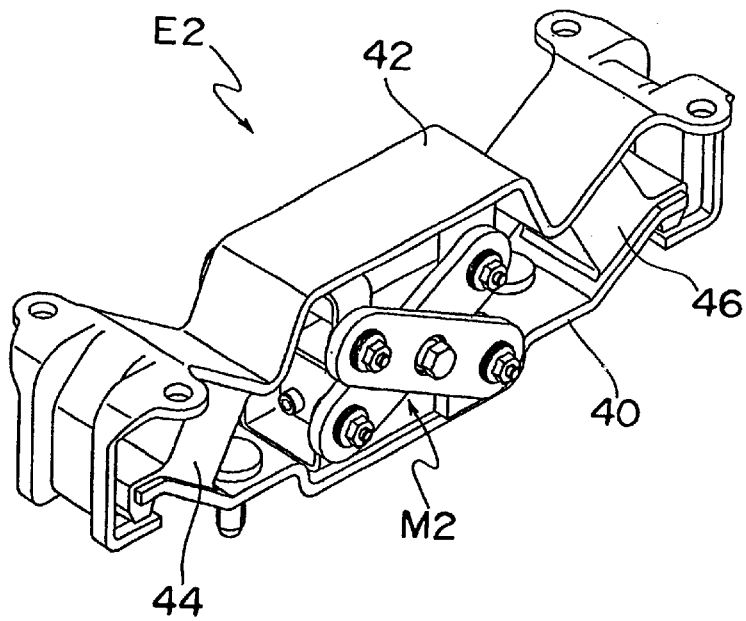
FIG. 11 is a perspective view of another engine mount in which a magneto-spring structure according to the present invention is employed.
Figure 12:
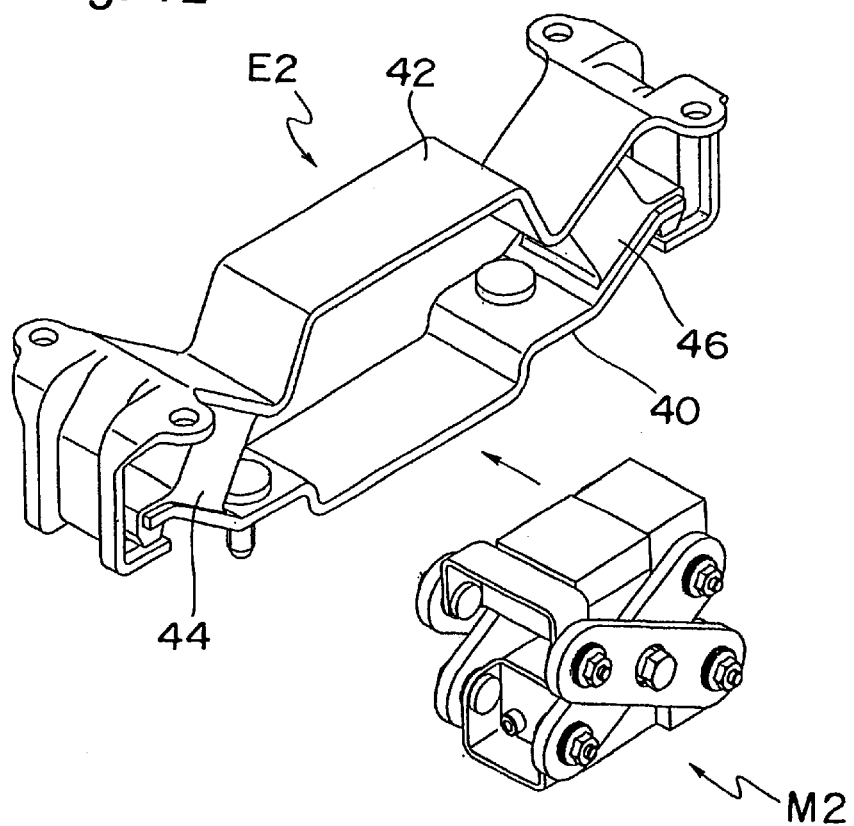
FIG. 12 is an exploded perspective view of the engine mount of FIG. 11.

FIGS. 11 and 12 depict another engine mount E2 employing the magneto-spring structure M according to the present invention.

The engine mount E2 includes a lower frame 40, which is to be secured to a vehicle floor, and an upper frame 42 vertically movably mounted on the lower frame 40 via a link mechanism. Elastic members 44, 46 made of, for example, rubber are interposed between the upper and lower frames 42, 40 at front end portions and rear end portions, respectively, while a magneto-spring structure M2 is interposed between the upper and lower frames 42, 40 at central portions thereof.

Figure 13:
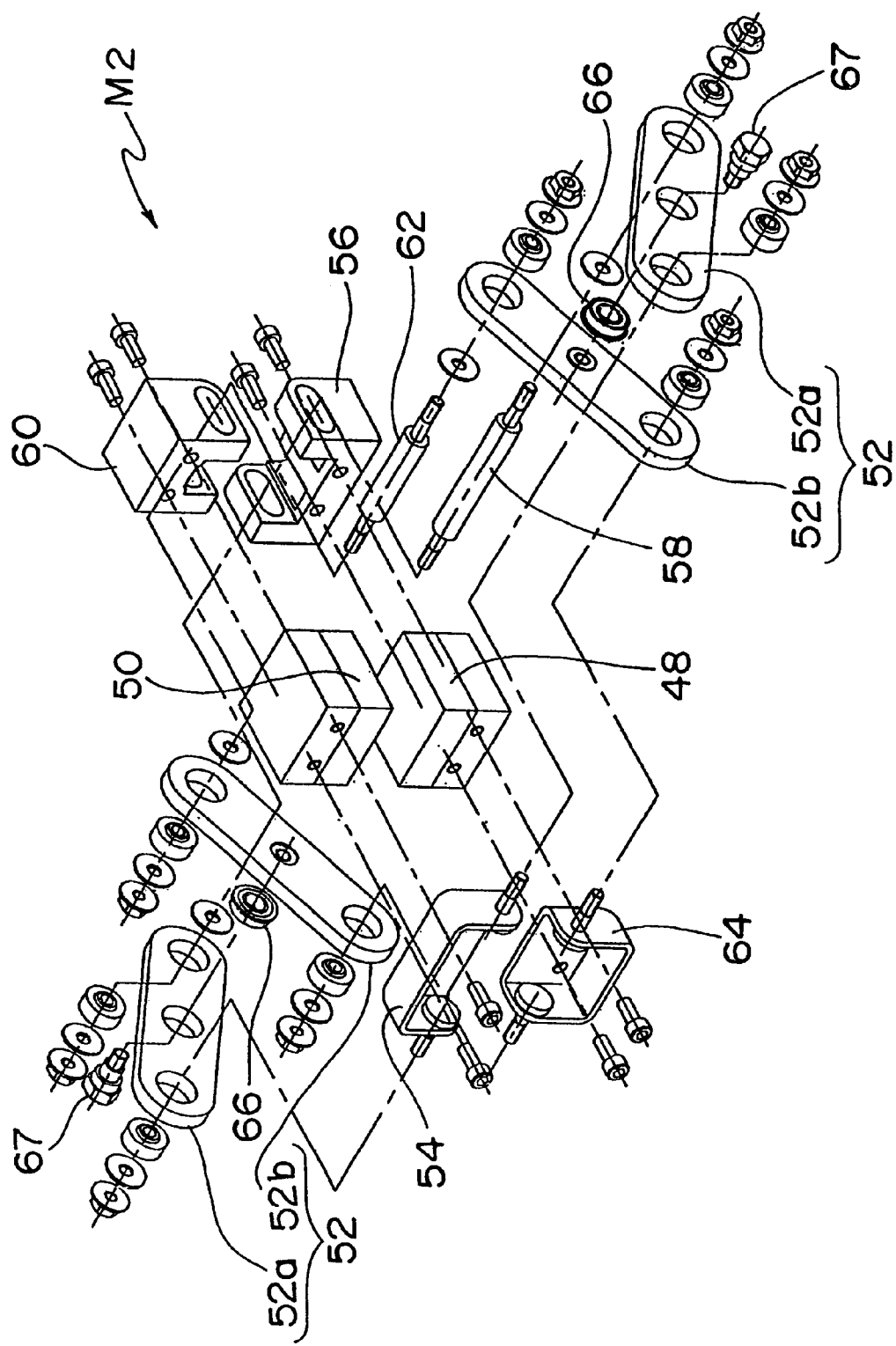
FIG. 13 is an exploded perspective view of the magneto-spring structure employed in the engine mount of FIG. 11.

As shown in FIG. 13, the magneto-spring structure M2 includes two permanent magnets 48, 50 having like magnetic poles opposed to each other and two X-shaped link assemblies 52, 52 disposed on respective sides of the two permanent magnets 48, 50. Each of the X-shaped link assemblies 52, 52 has two links 52a, 52b. An upper end of the link 52a is pivotally mounted on a front upper bracket 54 secured to a front end of the upper permanent magnet 50, while a lower end of the link 52a is pivotally mounted on one end of a rotary shaft 58 that is rotatably mounted on a rear lows bracket 56 secured to a rear end of the lower permanent magnet 48. On the other hand, an upper end of the link 52b is pivotally mounted on one end of a rotary shaft 62 that is rotatably mounted on a rear upper bracket 60 secured to a rear end of the upper permanent magnet 50, while a lower end of the link 52b is pivotally mounted on a front lower bracket 64 secured to a front end of the lower permanent magnet 48. Intermediate portions of the two links 52a, 52b are rotatably connected to each other via a bearing 66 and a pin 67 employed as a connecting member.

In the above-described construction, the two permanent magnets 48, 50 constitute a magneto-spring, and a repulsive force created therebetween is used to lift the upper frame 42.

Figure 14:
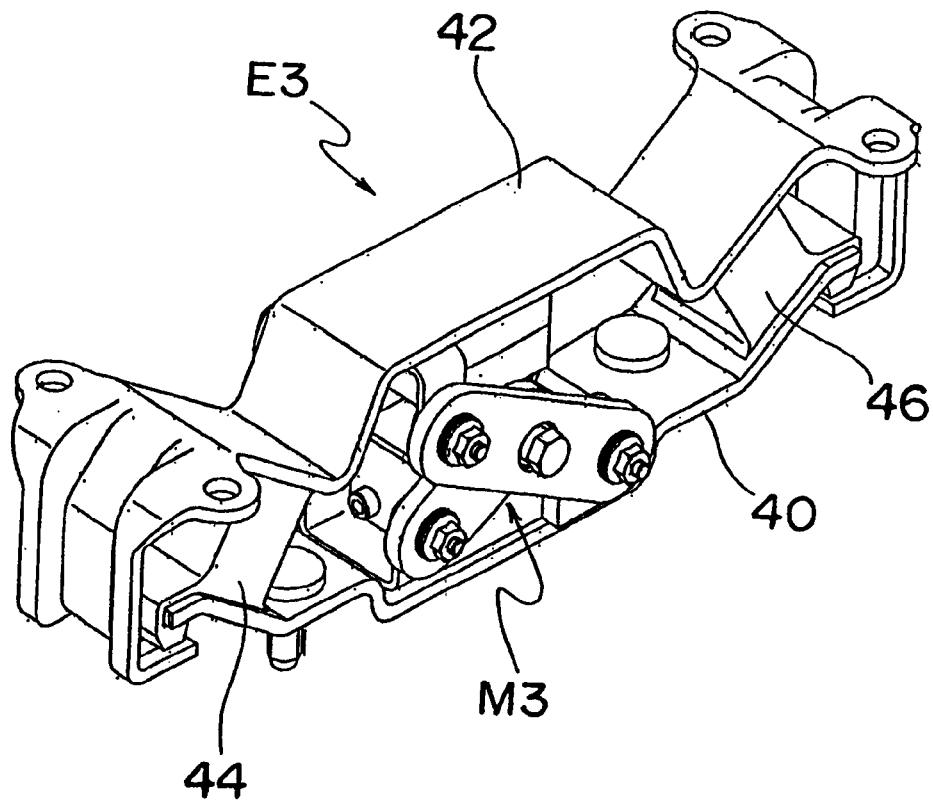
FIG. 14 is a perspective view of a further engine mount in which a magneto-spring structure according to the present invention is employed.
Figure 15:
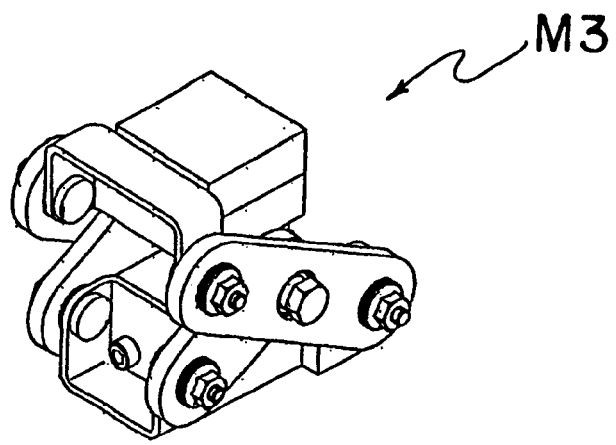
FIG. 15 is a perspective view of the magneto-spring structure employed in the engine mount of FIG. 14.

FIG. 14 depicts a further engine mount E3 employing the magneto-spring structure M according to the present invention. The engine mount E3 shown therein differ from the engine mount E2 in that a magneto-spring structure M3 shown in FIG. 15 is used in the engine mount E3 in place of the magneto-spring structure M2.

Figure 16:
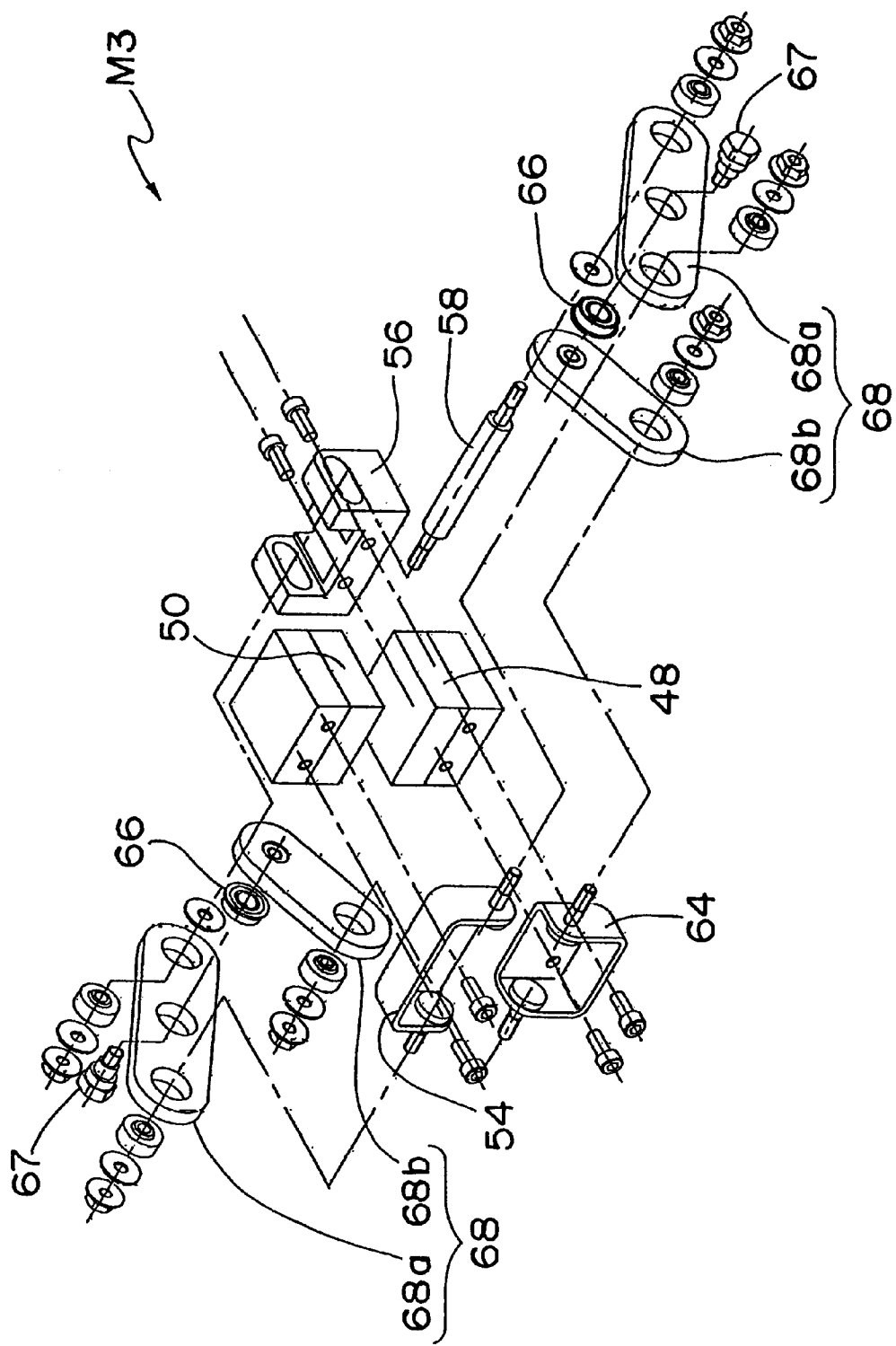
FIG. 16 is an exploded perspective view of the magneto-spring structure of FIG. 15.

As shown in FIG. 16, the magneto-spring structure M3 includes two permanent magnets 48, 50 having like magnetic poles opposed to each other and two y-shaped link assemblies 68, 68 disposed on respective sides of the two permanent magnets 48, 50. Each of the y-shaped link assemblies 68, 68 has two links 68a, 68b, a long one and a short one. An upper end of the long link 68a (the same as the link 52a) is pivotally mounted on a front upper bracket 54 secured to a front end of the upper permanent magnet 50, while a lower end of the long link 68a is pivotally mounted on one end of a rotary shaft 58 that is rotatably mounted on a rear lower bracket 56 secured to a rear end of the lower permanent magnet 48. On the other had, an upper end of the short link 68b is pivotally mounted on an intermediate portion of the link 68a via a bearing 66, while a lower end of the short link 68b is pivotally mounted on a front lower bracket 64 secured to a front end of the lower permanent magnet 48.

In the engine mounts E2, E3 of the above-described construction, the weight of an engine (not shown) placed on the upper frame 42 is supported by a repulsive force of the magneto-springs 48, 50 and elastic forces of the elastic members 44, 46. Vibration from the engine is attenuated by the magneto-spring 48, 50 and the elastic members 44, 46, and is further absorbed by the link mechanism.

It is to be noted here that although the permanent magnets 48, 50 employed in the engine mounts E2, E3 are single-pole magnets, two-pole magnets may be used, as in the engine mount E1.

The magnetic force distribution of a magneto-spring in which two two-pole magnets of the same size are used and that of another magneto-spring in which two single-pole magnets of the same size are used are discussed hereinafter with reference to FIGS. 17 to 32.

Figure 17:
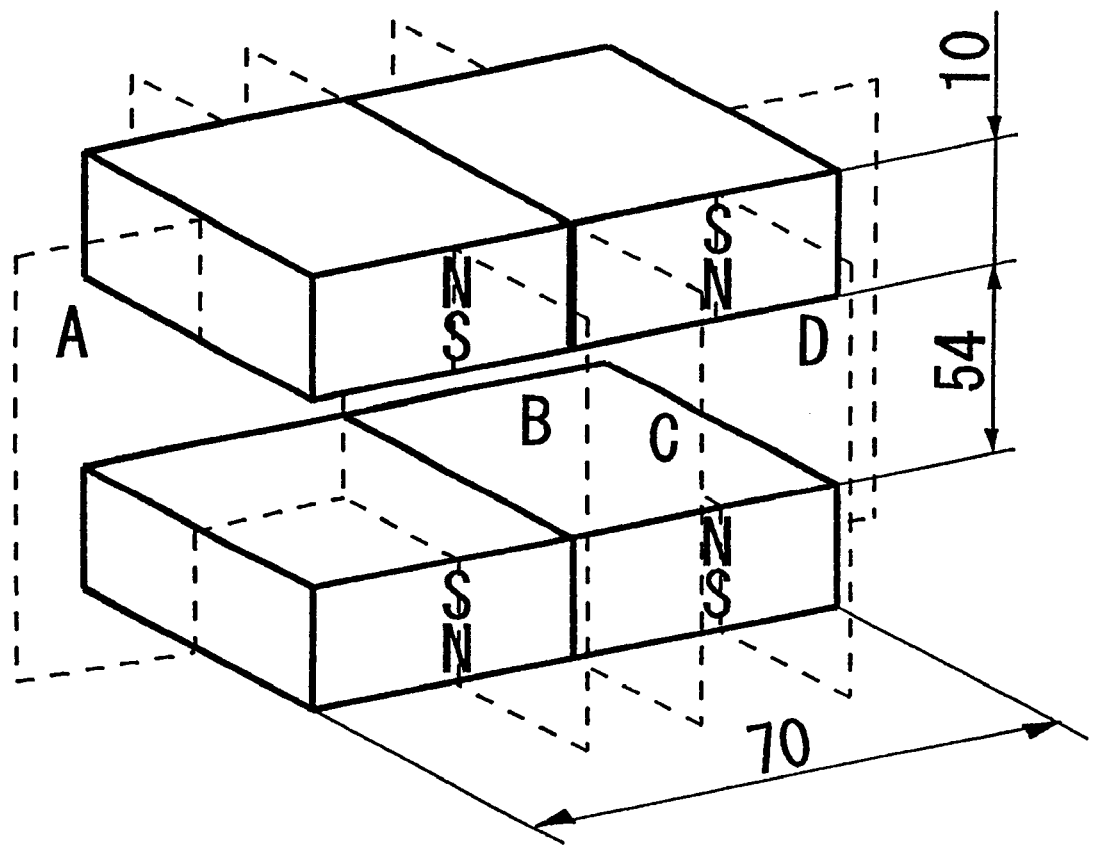
FIG. 17 is a perspective view of a magneto-spring made up of two two-pole magnets.

FIG. 17 depicts a magneto-spring made up of two two-pole magnets having a size of 70 mmL×35 mmW×10 mmH. FIGS. 18A, 18B, 18C, and 18D depict magnetic force distributions on planes A, B, C, and D in FIG. 17, respectively. FIGS. 19, 2 and 23 depict the two two-pole magnets when the spacing therebetween is set 38 mm, 54 mm and 108 mm, respectively, while FIGS. 20, 22 and 24 depict magnetic force distributions plane A under such set conditions.

Figure 25:
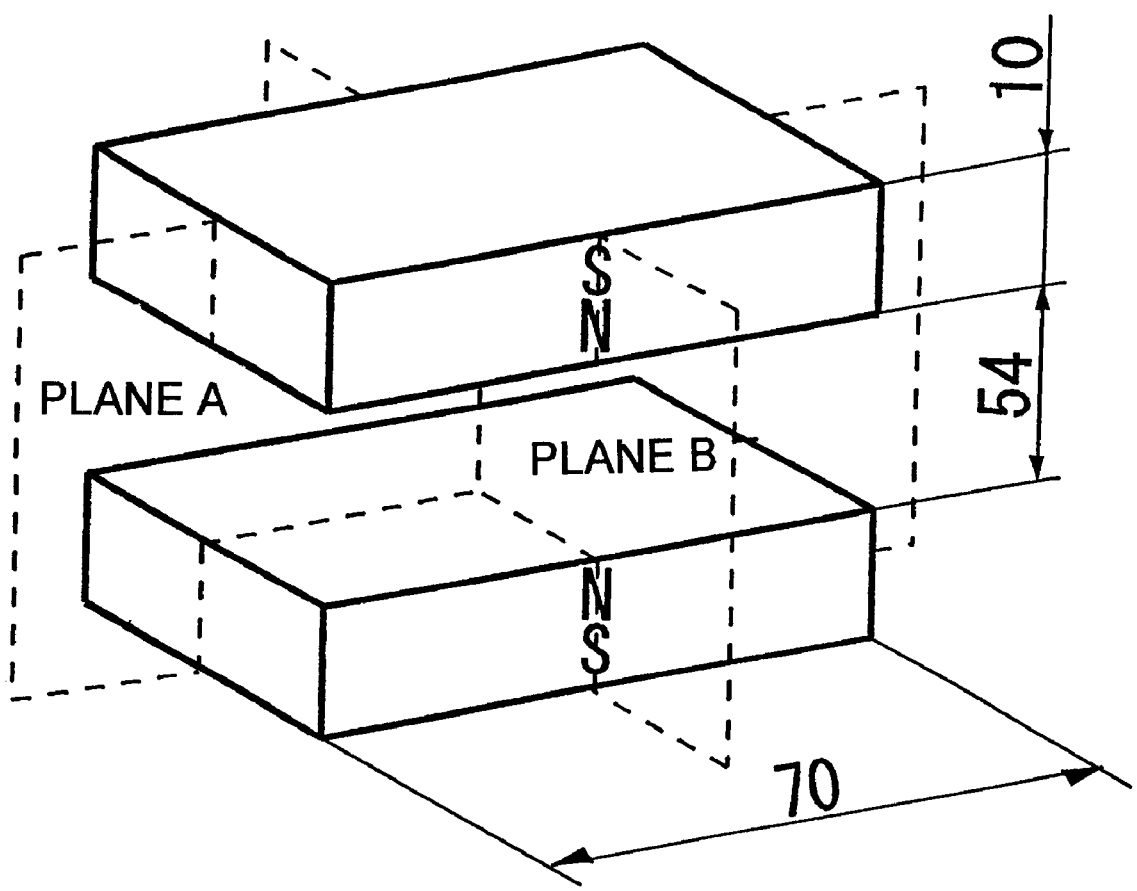
FIG. 25 is a perspective view of a magneto-spring made up of two single-pole magnets.
Figure 26A:
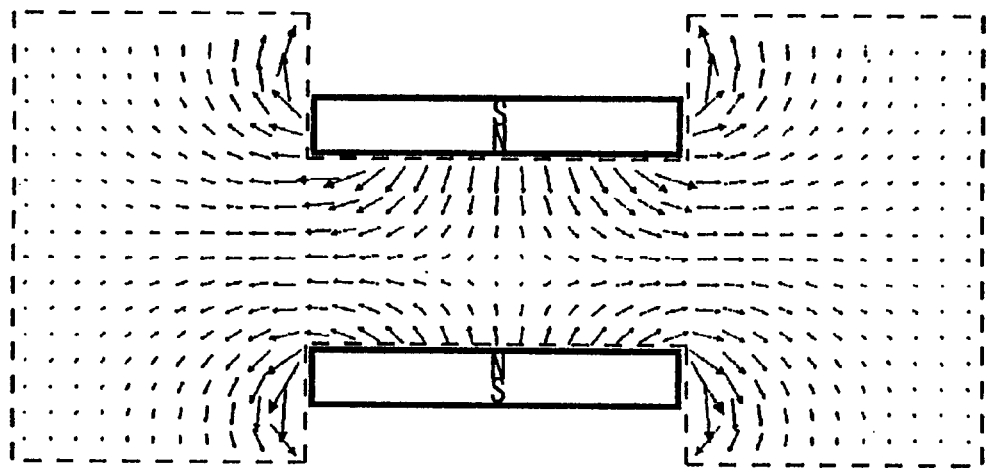
FIG. 26A is a magnetic force distribution diagram on plane A in FIG. 25.
Figure 26B:
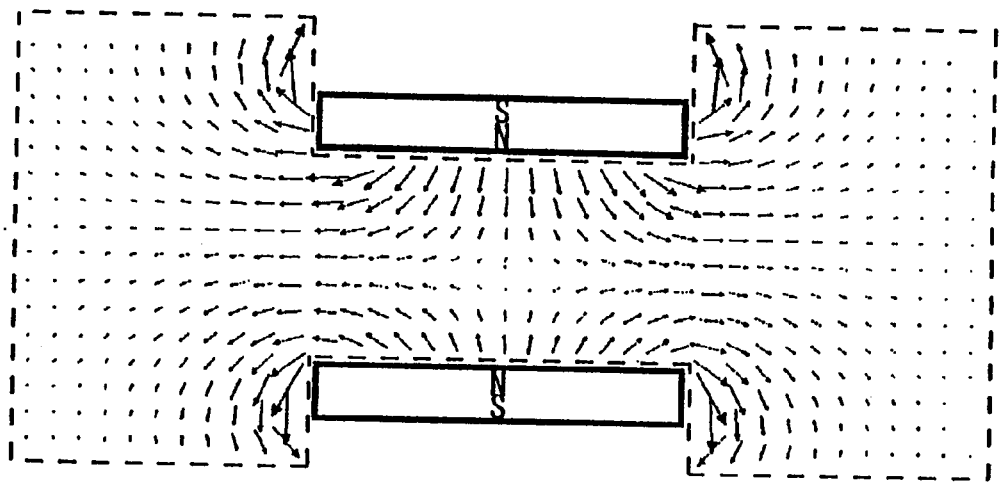
FIG. 26B is a magnetic force distribution diagram on plane B in FIG. 25.
Figure 27:
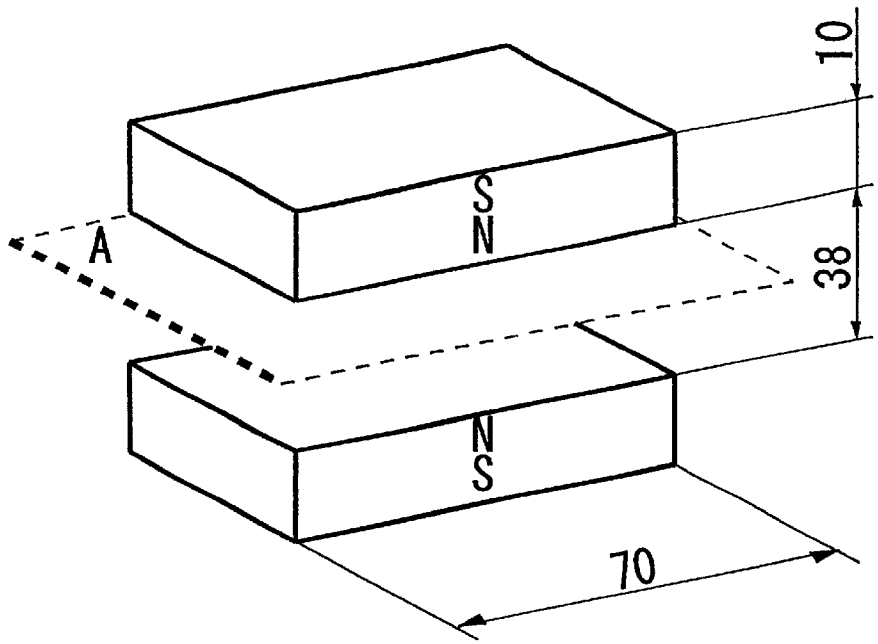
FIG. 27 is a perspective view of the magneto-spring of FIG. 25 when the spacing between the two magnets is 38 mm.

Similarly, FIG. 25 depicts a magneto-spring made up of two single-pole magnets having the same size as the above two-pole magnets, while FIGS. 26A and 26B depict magnetic force distributions on planes A and B in FIG. 25, respectively. FIGS. 27, 29 and 31 depict the two single-pole magnets when the spacing therebetween is set 38 mm, 54 mm and 108 mm, respectively, while FIGS. 28, 30 and 32 depict magnetic force distributions on plane A under such set conditions.

In the magnetic force distribution diagrams, the width of each arrow indicates the magnitude of the magnetic force.

Figure 18A:
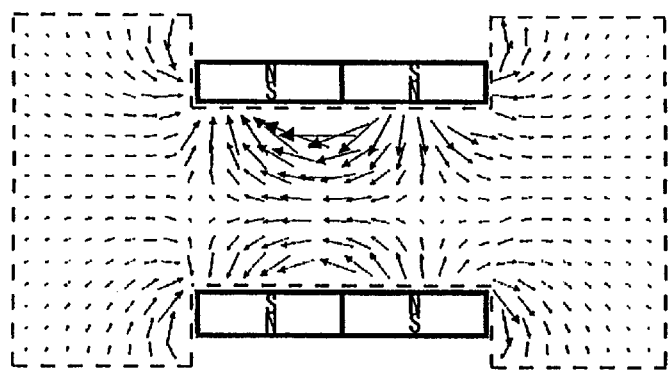
FIG. 18A is a magnetic force distribution diagram on plane A in FIG. 17.
Figure 18B:
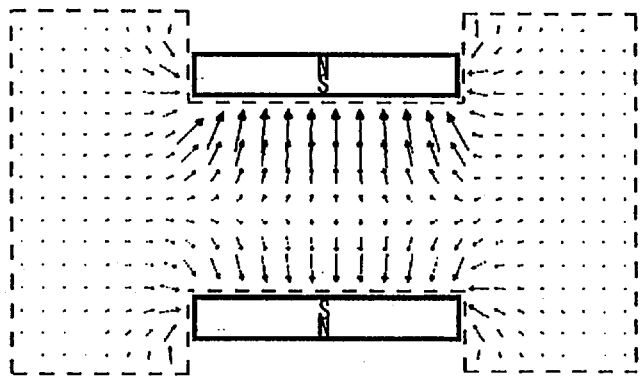
FIG. 18B is a magnetic force distribution diagram on plane B in FIG. 17.
Figure 18C:
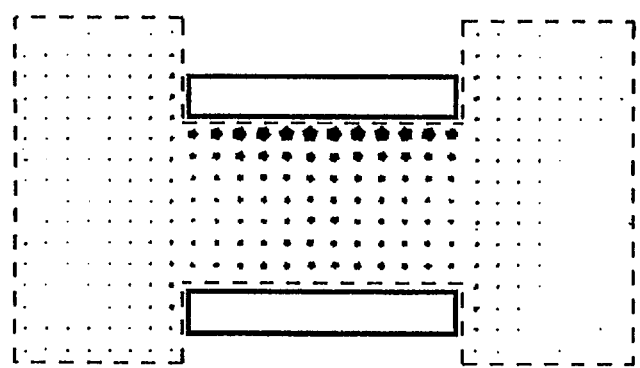
FIG. 18C is a magnetic force distribution diagram on plane C in FIG. 17.
Figure 18D:
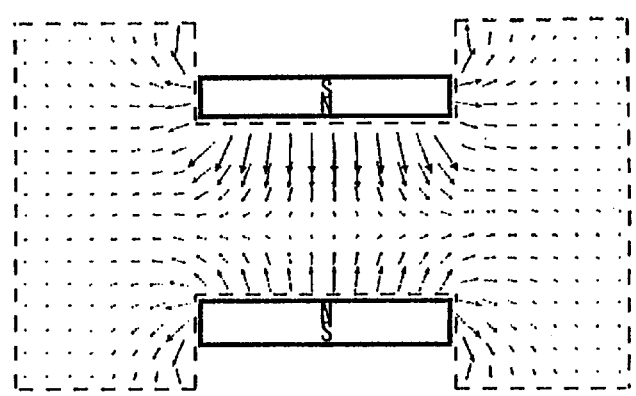
FIG. 18D is a magnetic force distribution diagram on plane D in FIG. 17.
Figure 19:
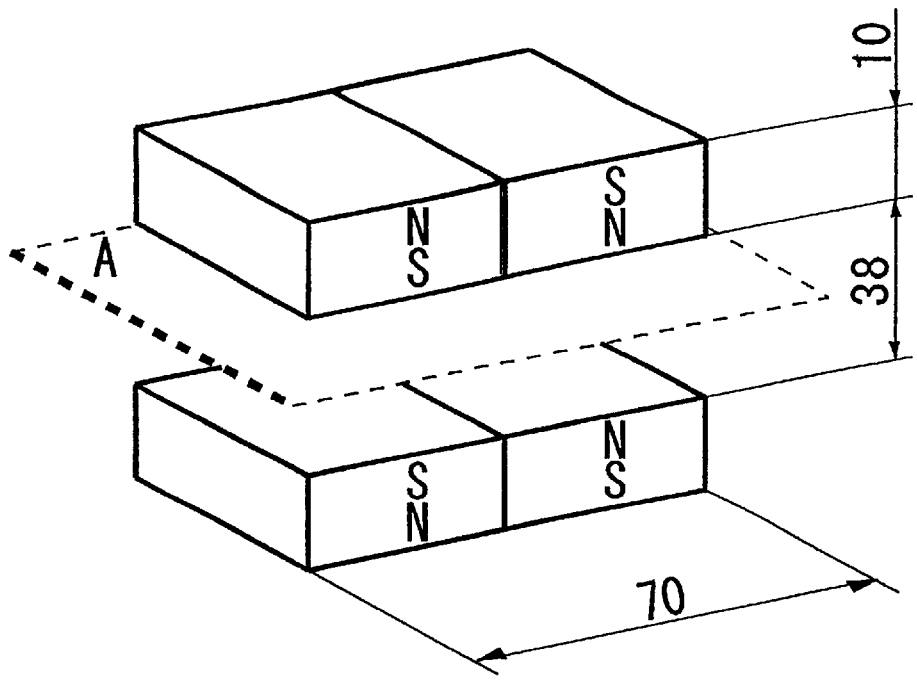
FIG. 19 is a perspective view of the magneto-spring of FIG. 17 when the spacing between the two magnets is 38 mm.
Figure 20:
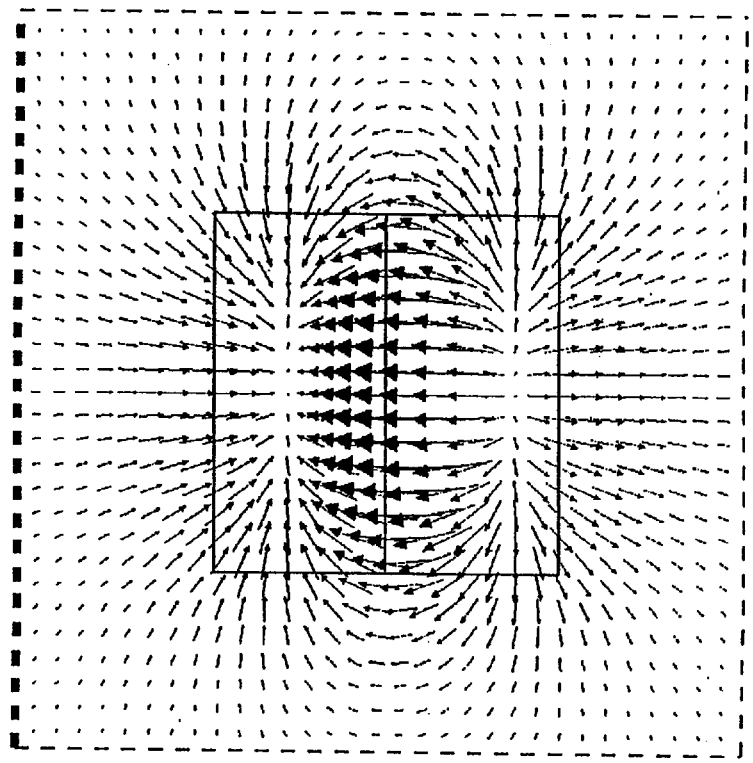
FIG. 20 is a magnetic force distribution diagram on plane A in FIG. 19.
Figure 21:
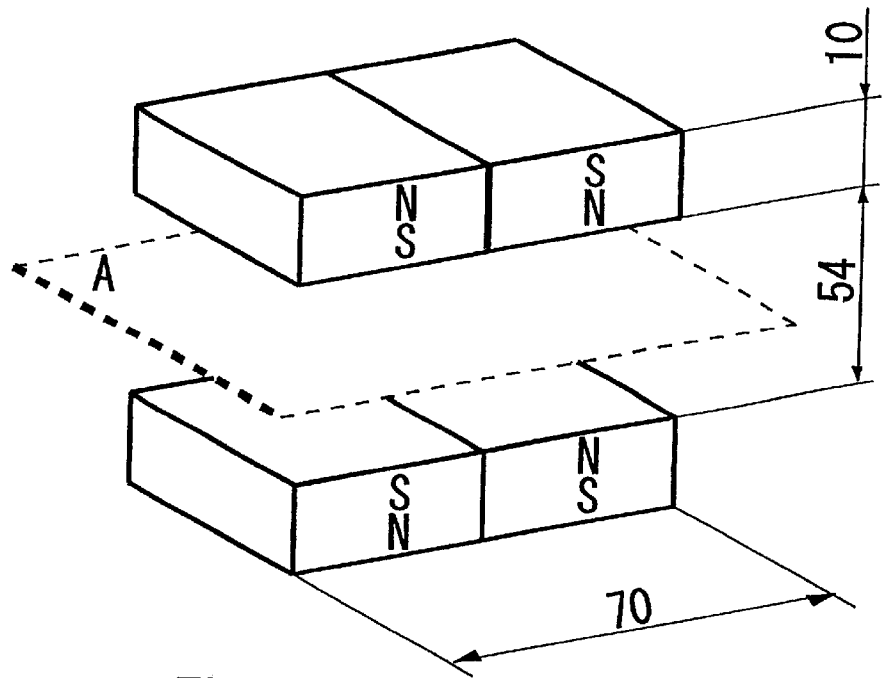
FIG. 21 is a view similar to FIG. 19, when the spacing between the two magnets is 54 mm.
Figure 22:
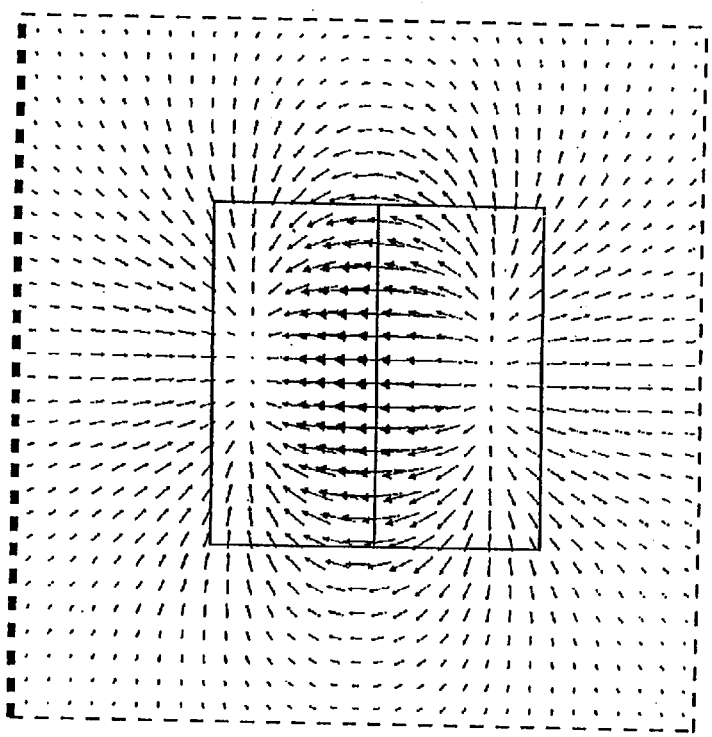
FIG. 22 is a magnetic force distribution diagram on plane A in FIG. 21.
Figure 23:
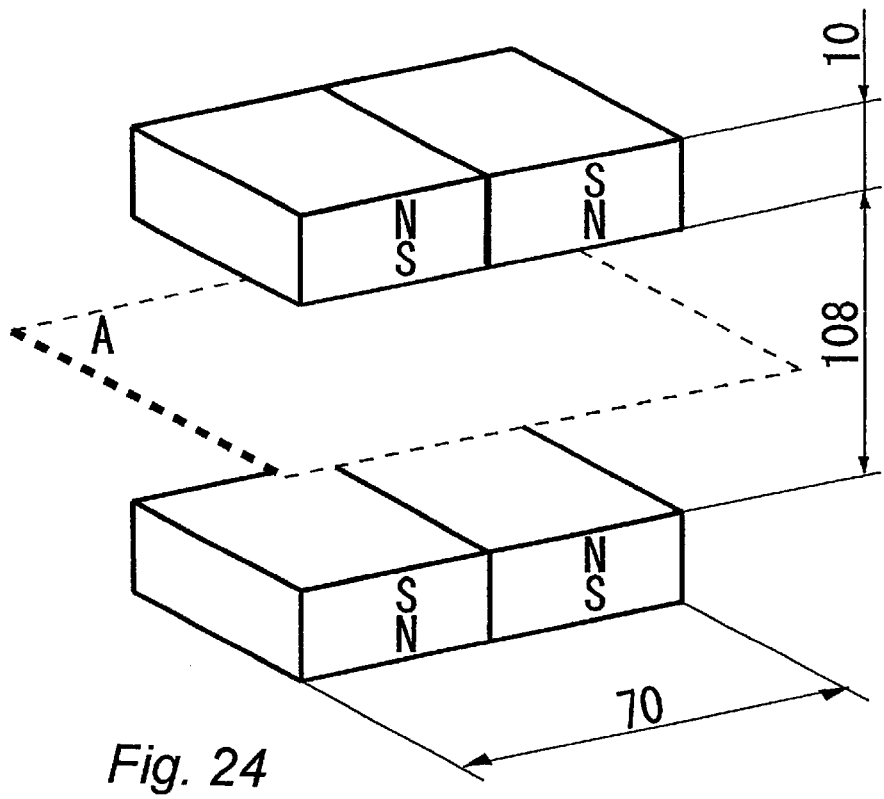
FIG. 23 is a view similar to FIG. 19, when the spacing between the two magnets is 108 mm.
Figure 24:
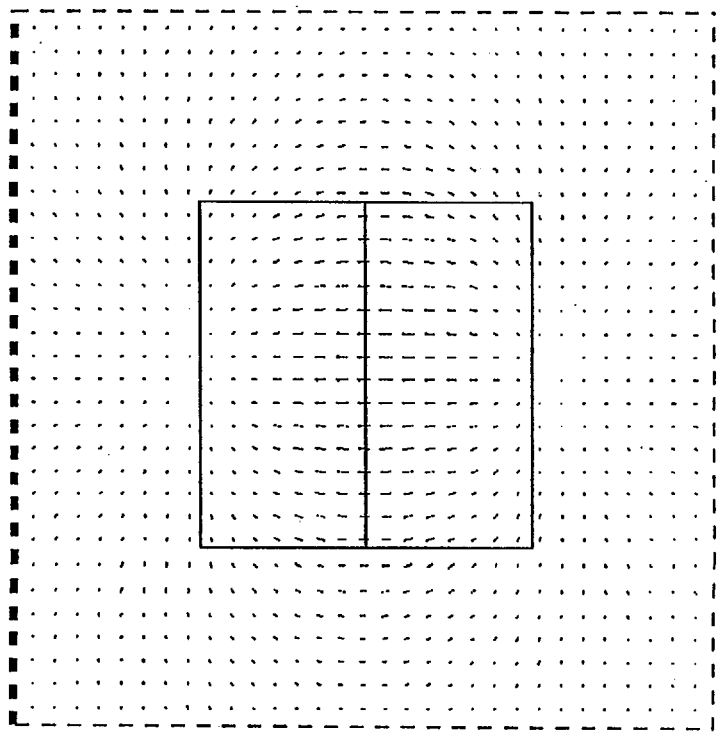
FIG. 24 is a magnetic force distribution diagram on plane A in FIG. 23.
Figure 28:
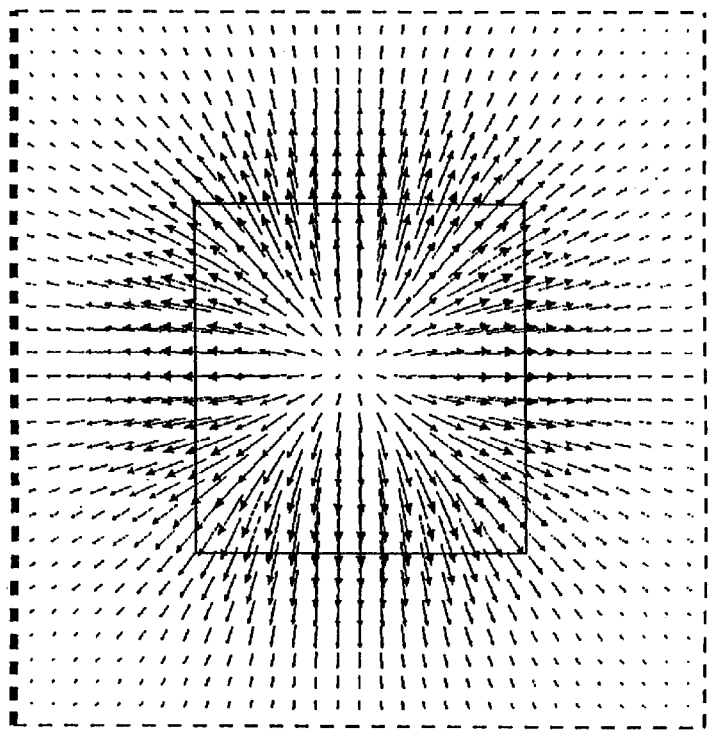
FIG. 28 is a magnetic force distribution diagram on plane A in FIG. 27.
Figure 29:
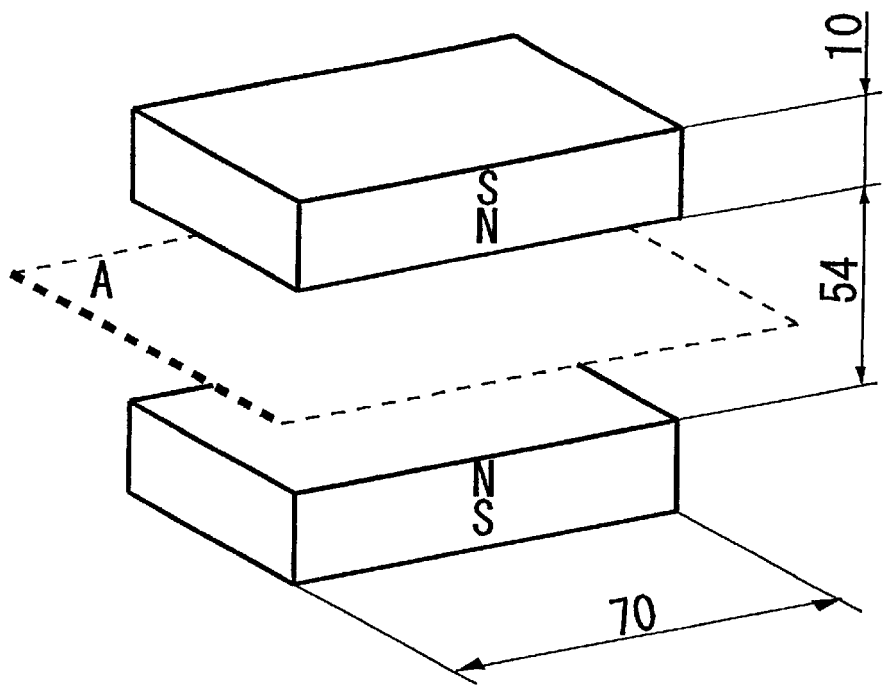
FIG. 29 is a view similar to FIG. 27, when the spacing between the two magnets is 54 mm.
Figure 30:
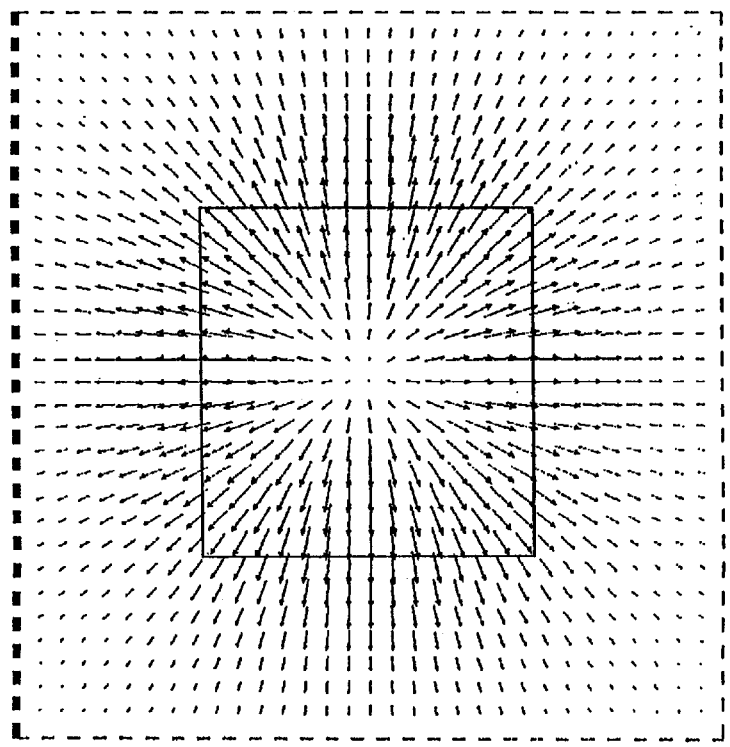
FIG. 30 is a magnetic force distribution diagram on plane A in FIG. 29.
Figure 31:
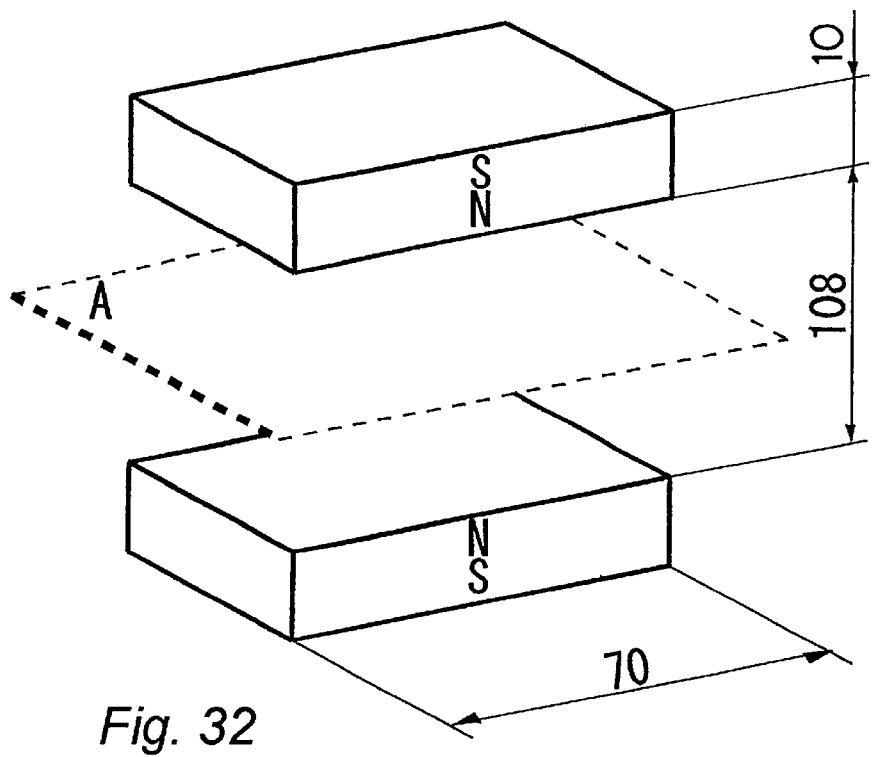
FIG. 31 is a view similar to FIG. 27, when the spacing between the two magnets is 108 mm.
Figure 32:
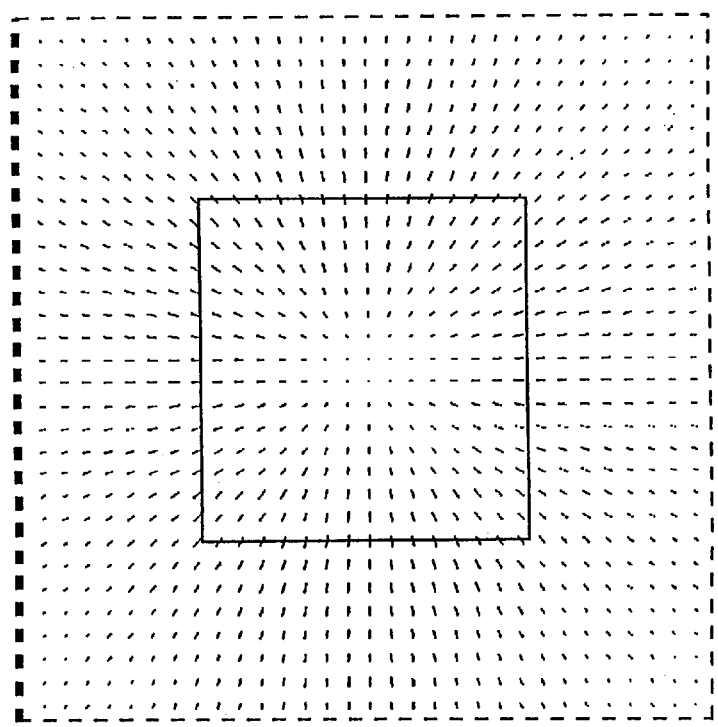
FIG. 32 is a magnetic force distribution diagram on plane A in FIG. 31.

When comparing FIGS. 18A and 18B with FIGS. 26A and 26B, and comparing FIG. 20 with FIG. 28, FIG. 22 with FIG. 30, and FIG. 24 with FIG. 32, it can be seen that the magneto-spring made up of the two-pole magnets has a magnetic force (repulsive force) greater than that of the magneto-spring made up of the single-pole magnets. Accordingly, the use of the two-pole magnets provides an effective magneto-spring.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A magneto-spring structure comprising:

a lower frame;

an upper frame vertically movably mounted on said lower frame;

a link mechanism for connecting said upper and lower frames, said link mechanism having a plurality of links made of non-magnetic material;

first and second permanent magnets secured to said upper and lower frames, respectively, with like magnetic poles opposed to each other;

a connecting member for rotatably connecting said plurality of links; and a bearing made of ferromagnetic material in which said connecting member is inserted.

2. The magneto-spring structure according to claim 1, wherein said connecting member is made of non-magnetic material.

3. The magneto-spring structure according to claim 1, wherein each of said first and second permanent magnets comprises a two-pole magnet having two different magnetic poles on each of opposite surfaces thereof.

4. The magneto-spring structure according to claim 1, wherein said magneto-spring structure is used for an engine mount.

5. The magneto-spring structure according to claim 4, further comprising an elastic member interposed between said upper and lower frames.

* * * * *